United States Patent [19]

Day et al.

[11] Patent Number: 4,639,878

[45] Date of Patent: Jan. 27, 1987

[54] METHOD AND SYSTEM FOR AUTOMATICALLY DETERMINING THE POSITION AND ATTITUDE OF AN OBJECT

[75] Inventors: Chia P. Day, Troy; Kenneth W. Krause, Rochester; Louis L. Whitcomb, Troy, all of Mich.; Berthold K. P. Horn, Concord, Mass.

[73] Assignee: GMF Robotics Corporation, Troy, Mich.

[21] Appl. No.: 741,123

[22] Filed: Jun. 4, 1985

[51] Int. Cl.$^4$ .......................... G06E 15/46; B25J 9/00
[52] U.S. Cl. ...................... 364/513; 364/191; 364/516; 364/571; 364/478; 901/9; 901/47; 356/375; 358/101; 358/107
[58] Field of Search ............... 364/191–193, 364/513, 516, 571, 478; 901/9, 47; 356/2, 375, 376; 358/101, 107

[56] References Cited

U.S. PATENT DOCUMENTS

| | | | |
|---|---|---|---|
| 3,804,270 | 8/1974 | Michaud et al. | 901/47 |
| 3,986,007 | 10/1976 | Ruoff, Jr. | 364/513 |
| 4,105,925 | 8/1978 | Rossol et al. | 901/47 |
| 4,187,051 | 2/1980 | Kirsch et al. | 901/9 |
| 4,219,847 | 8/1980 | Pinkney et al. | 901/9 |
| 4,335,962 | 6/1982 | DiMatteo | 356/375 |
| 4,380,696 | 4/1983 | Masaki | 901/9 |
| 4,396,945 | 8/1983 | DiMatteo et al. | 901/9 |
| 4,402,053 | 8/1983 | Kelley et al. | 364/513 |
| 4,437,114 | 3/1984 | LaRussa | 358/101 |
| 4,453,085 | 6/1984 | Pryor | 901/47 |
| 4,456,961 | 6/1984 | Price et al. | 364/513 |
| 4,495,588 | 1/1985 | Nio et al. | 364/191 |
| 4,517,653 | 5/1985 | Tsuchihashi et al. | 364/513 |
| 4,575,304 | 3/1986 | Nakagawa et al. | 901/47 |
| 4,581,566 | 4/1986 | Ekstrom et al. | 364/513 |
| 4,590,578 | 5/1986 | Barto, Jr. et al. | 364/191 |

Primary Examiner—Jerry Smith
Assistant Examiner—John R. Lastova
Attorney, Agent, or Firm—Brooks & Kushman

[57] ABSTRACT

A method and system are provided for automatically determining the position and attitude of a three-dimensional body at a work station by utilizing three cameras each of which generates a non-overlapping plane of image data, including a single target point of the body without the use of structured light. The locations of the target points are determined and processed within a programmed computer together with calibration data relating to the expected position of the body in the work station to provide data relating to the position and attitude of the body with respect to the work station. The resultant data relating to the position and attitude of the body are subsequently transformed into a first set of offset data relating to the difference between the actual and expected positions of the body. The first set of offset data is then transformed into a second set of offset data in the coordinate system of a peripheral device such as a robot, programmable controller, numerically controlled machine, etc. Finally, the programmed computer transfers the second set of offset data to the peripheral device which utilizes the data to modify its pre-programmed path.

18 Claims, 20 Drawing Figures

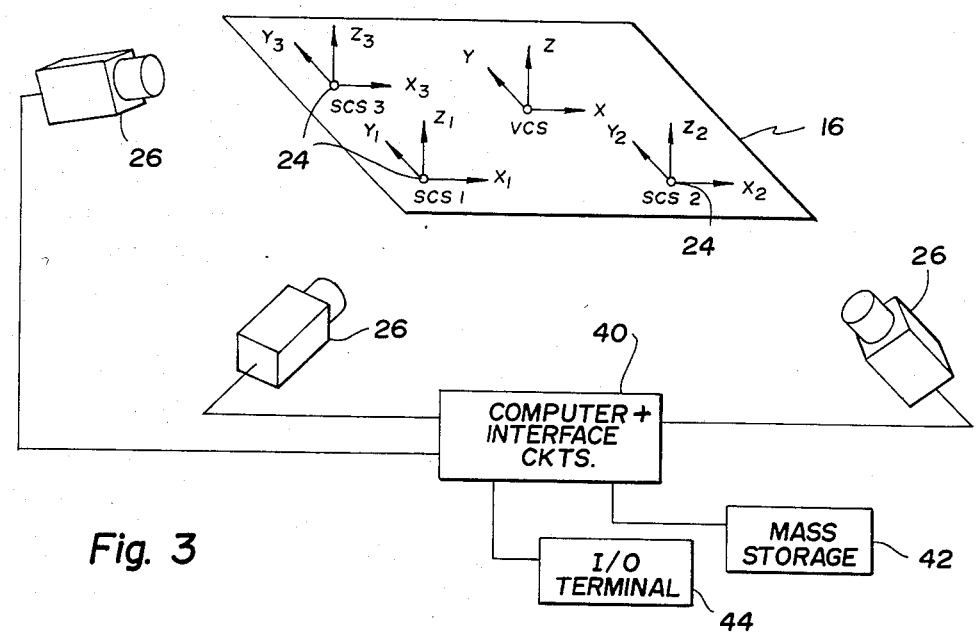
Fig. 3
Fig. 4
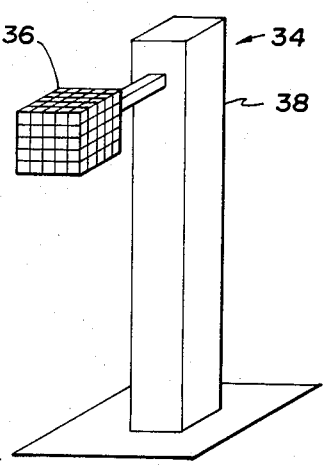
Fig. 5
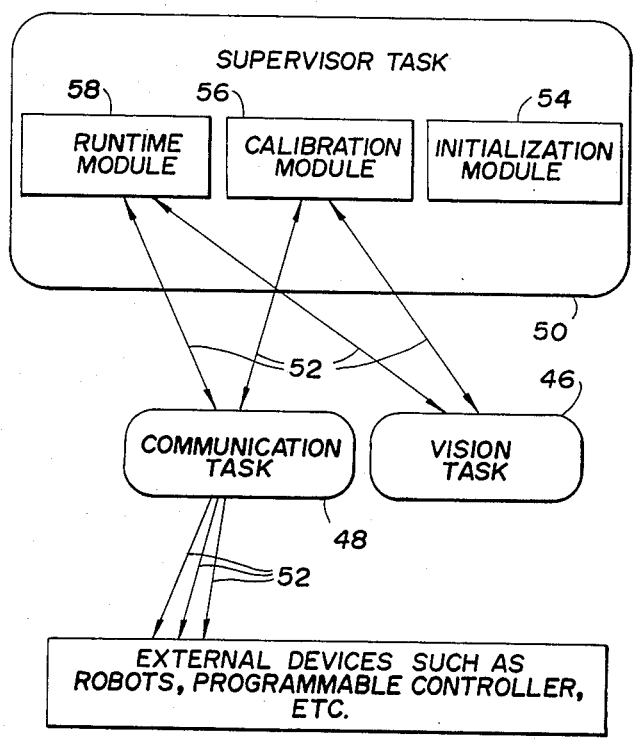

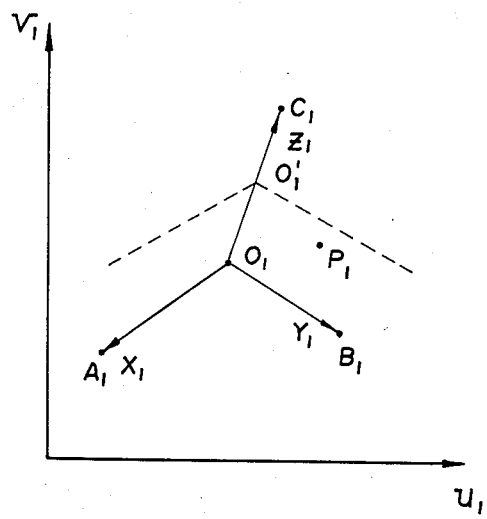

$\hat{u}, \hat{v}$ ARE UNIT VECTORS IN THE IMAGE PLANE.
ALL POINTS ARE ORDERED $(u,v)$ PAIRS. THUS:

$O_I = (u_{O_I}) \hat{u} + (v_{O_I}) \hat{v}$.

$P_I = (u_{P_I}) \hat{u} + (v_{P_I}) \hat{v}$.

ETC.

ALL POINTS ALSO HAVE $(X,Y,Z)$ COORDINATES IN THE SENSOR COORDINATE SYSTEM.

Fig. 10A $P = P_I - O_I = (u_{P_I} - u_{O_I})\hat{u} + (v_{P_I} - v_{O_I})\hat{v}$ $A = A_I - O_I = (u_{A_I} - u_{O_I})\hat{u} + (v_{A_I} - v_{O_I})\hat{v}$ $B = B_I - O_I = (u_{B_I} - u_{O_I})\hat{u} + (v_{B_I} - v_{O_I})\hat{v}$ $P = (u_{P_I O_I})\hat{u} + (v_{P_I O_I})\hat{v}$ $A = (u_{A_I O_I})\hat{u} + (v_{A_I O_I})\hat{v}$ $B = (u_{B_I O_I})\hat{u} + (v_{B_I O_I})\hat{v}$

Fig. 10B $$P = x_1 A + y_1 B \tag{1}$$

$$P = (u_{P_1 O_1})\hat{u} + (v_{P_1 O_1})\hat{v} \tag{2}$$

$$P = x_1[(u_{A_1 O_1})\hat{u} + (v_{A_1 O_1})\hat{v}] + y_1[(u_{B_1 O_1})\hat{u} + (v_{B_1 O_1})\hat{v}] \tag{3}$$

$$\left.\begin{array}{l} u_{P_1 O_1} = x_1 u_{A_1 O_1} + y_1 u_{B_1 O_1} \\ v_{P_1 O_1} = x_1 v_{A_1 O_1} + y_1 v_{B_1 O_1} \end{array}\right\} \tag{4}$$

$$x_1 = \frac{\begin{vmatrix} u_{P_1 O_1} & u_{B_1 O_1} \\ v_{P_1 O_1} & v_{B_1 O_1} \end{vmatrix}}{\begin{vmatrix} u_{A_1 O_1} & u_{B_1 O_1} \\ v_{A_1 O_1} & v_{B_1 O_1} \end{vmatrix}} \quad y_1 = \frac{\begin{vmatrix} u_{A_1 O_1} & u_{P_1 O_1} \\ v_{A_1 O_1} & v_{P_1 O_1} \end{vmatrix}}{\begin{vmatrix} u_{A_1 O_1} & u_{B_1 O_1} \\ v_{A_1 O_1} & v_{B_1 O_1} \end{vmatrix}}$$

*Fig. 10C*

$$O_1' = O_1 + z_1(C_1 - O_1) = (u_{O_1} + z_1 u_{CO})\hat{u} + (v_{O_1} + z_1 v_{CO})\hat{v} \tag{5}$$

$$P_1' = P_1 - O_1' = (u_P - u_O - z_1 u_{CO})\hat{u} + (v_P - v_O - z_1 v_{CO})\hat{v} \tag{6}$$

$$A = A_1 - O_1 = (u_{AO})\hat{u} + (v_{AO})\hat{v} \tag{7}$$

$$B = B_1 - O_1 = (u_{BO})\hat{u} + (v_{BO})\hat{v} \tag{8}$$

$$P' = x_1 A + y_1 B \tag{9}$$

*Fig. 10D*

$$(U_P - U_O - \mathcal{Z}_1 U_{CO})\hat{u} + (V_P - V_O - \mathcal{Z}_1 V_{CO})\hat{v} =$$
$$= X_1[(U_{AO})\hat{u} + (V_{AO})\hat{v}] + \mathcal{Y}_1[(U_{BO})\hat{u} + (V_{BO})\hat{v}] \quad (10)$$

$$\left.\begin{array}{l} U_{PO} - \mathcal{Z}_1 U_{CO} = X_1 U_{AO} + \mathcal{Y}_1 U_{BO} \\ V_{PO} - \mathcal{Z}_1 V_{CO} = X_1 V_{AO} + \mathcal{Y}_1 V_{BO} \end{array}\right\} \quad (11)$$

$$X_1 = \frac{\begin{vmatrix} (U_{PO} - \mathcal{Z}_1 U_{CO}) & U_{BO} \\ (V_{PO} - \mathcal{Z}_1 V_{CO}) & V_{BO} \end{vmatrix}}{\begin{vmatrix} U_{AO} & U_{BO} \\ V_{AO} & V_{BO} \end{vmatrix}} \quad \mathcal{Y}_1 = \frac{\begin{vmatrix} U_{AO} & (U_{PO} - \mathcal{Z}_1 U_{CO}) \\ V_{AO} & (V_{PO} - \mathcal{Z}_1 V_{CO}) \end{vmatrix}}{\begin{vmatrix} U_{AO} & U_{BO} \\ V_{AO} & V_{BO} \end{vmatrix}}$$

WHICH CAN BE REWRITTEN AS:

$$X_1 = \alpha_1 \mathcal{Z}_1 + \beta_1$$
$$\mathcal{Y}_1 = \gamma_1 \mathcal{Z}_1 + \delta_1 \quad (12)$$

WHERE $\alpha_1, \beta_1, \gamma_1$, AND $\delta_1$ ARE CONSTANTS GIVEN BY:

$$\alpha_1 = \frac{-\begin{vmatrix} U_{CO} & U_{BO} \\ V_{CO} & V_{BO} \end{vmatrix}}{\begin{vmatrix} U_{AO} & U_{BO} \\ V_{AO} & V_{BO} \end{vmatrix}} \quad \beta_1 = \frac{\begin{vmatrix} U_{PO} & U_{BO} \\ V_{PO} & V_{BO} \end{vmatrix}}{\begin{vmatrix} U_{AO} & U_{BO} \\ V_{AO} & V_{BO} \end{vmatrix}}$$

$$\gamma_1 = \frac{-\begin{vmatrix} U_{AO} & U_{CO} \\ V_{AO} & V_{CO} \end{vmatrix}}{\begin{vmatrix} U_{AO} & U_{BO} \\ V_{AO} & V_{BO} \end{vmatrix}} \quad \delta_1 = \frac{\begin{vmatrix} U_{AO} & U_{PO} \\ V_{AO} & V_{PO} \end{vmatrix}}{\begin{vmatrix} U_{AO} & U_{BO} \\ V_{AO} & V_{BO} \end{vmatrix}}$$

Fig. 10E $$X_1 = \alpha_1 z_1 + \beta_1$$
$$Y_1 = \gamma_1 z_1 + \delta_1 \tag{13}$$
$$X_2 = \alpha_2 z_2 + \beta_2$$
$$Y_2 = \gamma_2 z_2 + \delta_2 \tag{14}$$
$$X_3 = \alpha_3 z_3 + \beta_3$$
$$Y_3 = \gamma_3 z_3 + \delta_3 \tag{15}$$
Fig. 10F
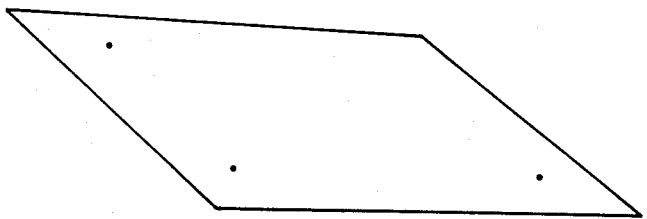
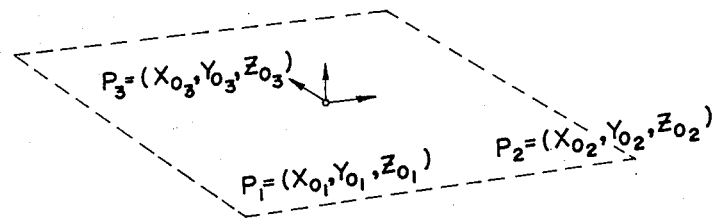
Fig. 10G $$d_{12} = |\overline{O_1 O_2}| = |\overline{P_1 P_2}|$$

$$d_{23} = |\overline{O_2 O_3}| = |\overline{P_2 P_3}|$$

$$d_{31} = |\overline{O_3 O_1}| = |\overline{P_3 P_1}|$$

$$d_{12} = \left[(X_{O_1} - X_{O_2})^2 + (Y_{O_1} - Y_{O_2})^2 + (Z_{O_1} - Z_{O_2})^2\right]^{1/2}$$

$$d_{12} = \left[X_{O_{12}}^2 + Y_{O_{12}}^2 + Z_{O_{12}}^2\right]^{1/2}$$

$$d_{23} = \left[X_{O_{23}}^2 + Y_{O_{23}}^2 + Z_{O_{23}}^2\right]^{1/2}$$

$$d_{31} = \left[X_{O_{31}}^2 + Y_{O_{31}}^2 + Z_{O_{31}}^2\right]^{1/2}$$

$$\left.\begin{array}{l} d_{12}^2 = (X_{O_{12}} + x_1 - x_2)^2 + (Y_{O_{12}} + y_1 - y_2)^2 + (Z_{O_{12}} - z_1 + z_2)^2 \\ d_{23}^2 = (X_{O_{23}} + x_2 - x_3)^2 + (Y_{O_{23}} + y_2 - y_3)^2 + (Z_{O_{23}} + z_2 - z_3)^2 \\ d_{31}^2 = (X_{O_{31}} + x_3 - x_1)^2 + (Y_{O_{31}} + y_3 - y_1)^2 + (Z_{O_{31}} + z_3 - z_1)^2 \end{array}\right\} \quad (16)$$

Fig. 10 H $$(X_{O_{12}} + \alpha_1 z_1 + \beta_1 - \alpha_2 z_2 - \beta_2)^2 + (Y_{O_{12}} + \gamma_1 z_1 + \delta_1 - \gamma_2 z_2 - \delta_2)^2 + (Z_{O_{12}} + z_1 - z_2)^2 = d_{12}^2$$

$$(X_{O_{23}} + \alpha_2 z_2 + \beta_2 - \alpha_3 z_3 - \beta_3)^2 + (Y_{O_{23}} + \gamma_2 z_2 + \delta_2 - \gamma_3 z_3 - \delta_3)^2 + (Z_{O_{23}} + z_2 - z_3)^2 = d_{23}^2$$

$$(X_{O_{31}} + \alpha_3 z_3 + \beta_3 - \alpha_1 z_1 - \beta_1)^2 + (Y_{O_{31}} + \gamma_3 z_3 + \delta_3 - \gamma_1 z_1 - \delta_1)^2 + (Z_{O_{31}} + z_3 - z_1)^2 = d_{31}^2$$

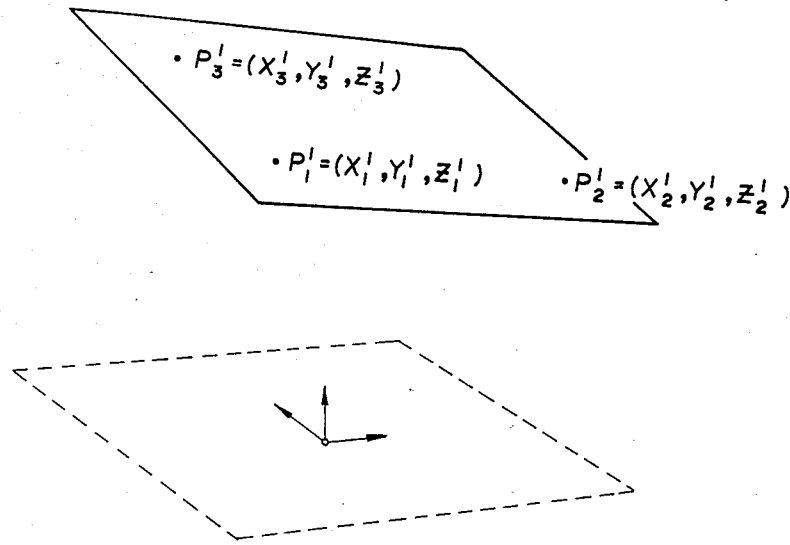

Fig. 10 J $$x_1' = f_{11}(x_1), \quad y_1' = f_{12}(y_1), \quad z_1' = f_{13}(z_1)$$

$$x_2' = f_{21}(x_2), \quad y_2' = f_{22}(y_2), \quad z_2' = f_{23}(z_2)$$

$$x_3' = f_{31}(x_3), \quad y_3' = f_{32}(y_3), \quad z_3' = f_{33}(z_3)$$

$$\lambda_1 = x_1/x_1' \qquad \mu_1 = y_1/y_1' \qquad \eta_1 = z_1/z_1'$$

$$\lambda_2 = x_2/x_2' \qquad \mu_2 = y_2/y_2' \qquad \eta_2 = z_2/z_2'$$

$$\lambda_3 = x_3/x_3' \qquad \mu_3 = y_3/y_3' \qquad \eta_3 = z_3/z_3'$$

$$\alpha_1' = \left(\frac{\eta_1}{\lambda_1}\right)\alpha_1, \beta_1' = \left(\frac{1}{\lambda_1}\right)\beta_1, \gamma_1' = \left(\frac{\eta_1}{\mu_1}\right)\gamma_1, \delta_1' = \left(\frac{1}{\mu_1}\right)\delta_1$$

$$\alpha_2' = \left(\frac{\eta_2}{\lambda_2}\right)\alpha_2, \beta_2' = \left(\frac{1}{\lambda_2}\right)\beta_2, \gamma_2' = \left(\frac{\eta_2}{\mu_2}\right)\gamma_2, \delta_2' = \left(\frac{1}{\mu_2}\right)\delta_2$$

$$\alpha_3' = \left(\frac{\eta_3}{\lambda_3}\right)\alpha_3, \beta_3' = \left(\frac{1}{\lambda_3}\right)\beta_3, \gamma_3' = \left(\frac{\eta_3}{\mu_3}\right)\gamma_3, \delta_3' = \left(\frac{1}{\mu_3}\right)\delta_3$$

Fig. 10 K

METHOD AND SYSTEM FOR AUTOMATICALLY DETERMINING THE POSITION AND ATTITUDE OF AN OBJECT

TECHNICAL FIELD

This invention relates in general to three-dimensional machine vision methods and systems and, in particular, to three-dimensional machine vision methods and systems for determining the position and attitude of an object.

BACKGROUND ART

3-D machine vision systems utilize a number of different schemes such as range finding, structured light and binocular vision to see in three dimensions. Range finding and structured light schemes are typically the easiest to implement. Both techniques rely for depth cues on the way light or other radiation such as sound waves reflect from the surface of an object. Range finding systems typically time the reflection of the laser beam to the object and back again to measure its distance—similar to radar.

Different range finding sensors have been applied to scene analysis. These sensors may be classified into two types. One is based on the trigonometry of triangulation and the other is based on the time of flight. Triangulation range sensors are further classified into two types, one of which is based on a stereo pair of television cameras or one camera alternately positioned in two locations. The other type is based on the projection of a sheet of light by a scanning transmitter and recording the image of the reflected light by a television camera. Alternatively, the second type may emit light by a "rocking" receiver. The first type suffers from the problem of finding corresponding points in two images of the scene. Both types have two additional drawbacks. missing data for points seen by the transmitter but not by the receiver and vice versa, and poor accuracy for points that are distant from the sensors.

The above drawbacks are eliminated by utilizing the second type of range imaging sensor with a laser scanner. This type of range finding sensor is also classified into two schemes, one of which is based on the transmission of a laser pulse and measuring the arrival time of the reflected signal. The other scheme is based on transmitting an amplitude modulated laser beam and measuring the phase shift of the reflected signal.

Structured light systems project light in a controlled manner on the object. The system then determines the distance to the object by triangulation and deduces the object's shape from the pattern formed by the intersection of the object's surface with the beam of light. For example, planes of light falling on a convex surface will form a family of curves which form a chevron pattern on an angular object.

Binocular vision systems utilize two cameras and employ the same general approach as that used in human vision (i.e. binocular parallax). The slight disparity between the two views of the same scene is used as a depth cue, i.e. the greater the parallax the closer the object.

One problem associated with the development of a practical machine vision system based on binocular parallax is the "correspondence" problem. That is, objects in each view must match with one another before the disparity between the two views can be determined. Matching can be a problem because, as a result of the parallax, an object may appear slightly differently in the right and left views and may be partially or totally obscured in one view.

3-D vision systems which rely on the range finding or structured light schemes are also inherently limited because they require interaction with the object under observation. These systems may be adequate for many applications. However, a vision system should be passive to avoid putting constraints on the observed objects or their environment. The United States Patents to Stern et al U.S. Pat. No. 4,357,108 and DiMattio et al U.S. Pat. No. 4,335,962 both disclose method and apparatus for determining spatial information by applying radiant energy patterns to an object and thereafter recording the reflected radiant energy.

The U.S. Patent to Rossel et al U.S. Pat. No. 4,105,925 discloses an optical object locator which determines the position and orientation of an object on a conveyor. Two planes of light intersect at a single transverse line on the conveyor surface. The method assumes a constant viewing distance and perspective.

Special vision problems are encountered during vehicle assembly. For example, frequently during the assembly process a partially completed vehicle body proceeds down the assembly line while being loosely held by a carrying fixture. The exact position of the body is not known at any work station. Rather, the body is located within a finite window of uncertainty which is both known and constant. The window is generally so large that the automation of work at the station is either impossible or prohibitively expensive. Even with mechanical constraints designed to locate and hold the body, the positional uncertainty often precludes the use of automated tools.

A related problem is that of non-rigid bodies. In practice it has been observed that "identical" vehicle bodies produced on the same assembly line will often have unpredictable dimensional irregularities. These irregularities and the compliance of a partially completed body have come to be an accepted artifact of modern design and manufacturing practices. It is clear that future manufacturing systems must be able to gracefully tolerate these irregularities.

One possible solution to these problems is to design the entire assembly line to extremely high tolerances to ensure that the body locations in space are invariant from one body to the next. Also, it must be ensured that the bodies are indeed "identical". Such an approach is shown by the United States Patent to Fujii et al U.S. Pat. No. 4,458,628. The Fujii et al patent discloses an apparatus for applying adhesive to automobile windshield glass panels which includes a turntable assembly for supporting the glass panel and moving it so that the peripheral portion of the glass panel is continually exposed to an adhesive applying nozzle of an industrial robot. Such an approach however requires a relatively high initial investment and expensive retooling costs to hold different workpieces.

Other possible solution are disclosed in the United States Patents to U.S. Pat. Nos. Blanchard et al 3,618,742, Michaud et al 3,804,270, Birk et al 4,146,924, Pryor et al 4,373,804 and Masaki 4,380,696. Each of these patents discloses a machine vision system which provides visual data which is subsequently processed and put into a form utilized to alter the preprogrammed path of the robot so that the robot can perform work on the object.

Such prior art machine vision methods and systems, however, are inadequate to solve the compliance and irregularity problems of vehicle bodies in a factory environment.

One area of current interest in the automated "factory of the future" is the dispensing of an adhesive by a robot. New applications for adhesives and sealants are being introduced as automobile manufacturers aggressively pursue anti-corrosion programs. These materials are used in the assembly of such hem-flanged parts as doors, decks and hoods.

In some cases, sealing materials are used in conjunction with more conventional spot welding. A sealant is applied first and then the sheet metal is welded through the sealant. This combined approach allows the distance between spot welds to be increased while reducing the number of welds. Some manufacturers have eliminated welding altogether on some hem-flanged assemblies by employing structural adhesives.

A number of factors are leading manufacturers to adhesive bonding. For example, the need for fuel economy has motivated auto manufacturers to reduce weight by using lighter gauge metal. However, mechanical welds and thinner metal do no provide satisfactory structural strength.

Manual application of such adhesives and sealants however, are generally impractical because of the high throughput and high accuracy required. The automotive manufacturing environment also places exacting demands on systems that can automatically apply adhesives and sealants. When such adhesives and sealants are improperly applied incorrect bonding or squeeze-out occurs.

Application systems for such adhesives and sealants must easily adapt to current production lines of material handling systems. The work cell must be sized to accommodate even the largest automotive components. In addition, control systems must be compatible with factory communication systems. Finally, the systems must be able to compensate for such things as changes in workpiece geometry produced by tool and die wear, product redesign and manufacturing improvements.

In any assembly operation there are several points on the vehicle body called gauge holes which are relatively invariant and used as a baseline for all measurements. The foundation of a house and the keel of a ship are examples of other types of baselines. In vehicle assembly the entire structure of a body is assembled with respect to the carefully positioned guage holes. While the body as a whole may be somewhat non-rigid, the gauge holes maintain a constant relationship with respect to each other.

DISCLOSURE OF THE INVENTION

An object of the present invention is to provide a method and system to automatically determine the position and attitude of a three-dimensional body in space in a quick and accurate fashion.

Another object of the present invention is to provide a method and system for automatically determining the position and attitude of a three-dimensional body in a rapid fashion wherein small variations in the body and ambient light conditions are tolerated without significantly degrading performance.

Still another object of the present invention is to provide a method and system for automatically determining the position and attitude of a three-dimensional body wherein no more than three cameras are utilized and wherein the cameras need not be specially constructed.

Yet still another object of the present invention is to provide a method and system for automatically determining the position and attitude of a three-dimensional body in a factory environment without special lighting such as structured lighting.

In carrying out the above objects and other objects of the present invention a method is provided for automatically determining the position and attitude of a three-dimensional body in space at a vision station having a fixed coordinate system. The body has at least three target points. The method includes the steps of generating calibration data relating to the expected position of the body at the vision station and generating a single plane of image data for each of the target points. Each plane of image data includes data relating to its repsective target point. The method also includes the steps of determining the location of the target points within their respective image planes to obtain positional data and processing the calibration data and the positional data together to provide data relating to the position and attitude of the body with respect to the fixed coordinate system.

Preferably, the method is utilized to provide path compensation data to a programmed robot controller to enable a robot controlled by the controller to move along a new path different from the path originally programmed in the controller to work on the three-dimensional body. The path compensation data relates to the difference between the actual and expected positions of the three-dimensional body at the work station. When utilized in this fashion, the method further comprises the additional steps of transforming the previously generated resultant data into a first set of offset data relating to the difference between the actual and expected positions of the body in the fixed coordinate system and further transforming the first set of offset data into a second set of offset data in the coordinate system of the robot. Finally, the method includes the step of transferring the second set of offset data to the controller.

A system for automatically determining the position and attitude of a three-dimensional body in space having at least three target points at a vision station having a fixed coordinate system and constructed in accordance with the present invention comprises means for storing calibration data relating to the expected position of the body at the vision station. The system further comprises at least three cameras which are spaced apart. Each of the cameras generates a plane of image data including image data relating to a single target point. The system also includes means for providing positional data relating to a location of each target point within its respective image plane and means for processing the calibration data and the positional data together to provide data relating to a position and attitude of a body within the fixed coordinate system.

Preferably, the system operates without the use of structured light.

Also, preferably, the system is used to automatically provide path compensation data to a programmed robot controller to enable a robot controlled by the controller to move along a new path different from the path originally programmed in the controller to work on the three-dimensional body. The path compensation data is related to the difference between the actual and expected positions of the three-dimensional body at the work station. The system further comprises means for transforming the previously generated resultant data into a first set of offset data relating to the difference between the actual and expected positions of the body in the fixed coordinate system. Means are also provided for transforming the first set of offset data into a second set of offset data in the coordinate system of the robot and means for transferring the second set of offset data to the controller.

The advantages of the above-described method and system are numerous. For example, three-dimensional body offsets are generated using only three image planes. Specifically, the vision system can seek out several known features or targets on the body and, when located, these target locations can be used to analytically determine the position of the entire body in space. Subsequently, this position information can then be communicated to automated equipment such as a robot controller. Because of this, it is only necessary to grossly position the body at the work station thus greatly increasing the throughput speed and reducing fixture costs.

The method and system are relatively insensitive to variations in the factory environment. Small changes in camera position, distortion of gauge hole placement and large variations in ambient lighting conditions have minimal effects on overall accuracy.

Currently available 3-D vision systems generally require upwards of six cameras or structured lighting. The present method and system requires only three cameras and no special lighting. Furthermore, the hardware utilized need not be highly specialized.

Other advantages of the present invention will be readily appreciated as the same becomes better understood by reference to the following detailed description when considered in connection with the accompanying drawings.

BRIEF DESCRIPTION OF THE DRAWINGS

FIG. 3 is a schematic view illustrating the relative positions between three cameras of the system and a rigid body in a vision coordinate system, the rigid body having three target points forming the origin of three respective sensor coordinate systems;

FIG. 4 is a perspective view illustrating a calibration fixture for use in the method and the system;

FIG. 5 is a schematic view of the software modules and tasks of the present invention and the flow of data therebetween;

FIGS. 10A through 10K show diagrams and mathematical equations which illustrate the mathematical foundation of the method and system of the present invention.

BEST MODE FOR CARRYING OUT THE INVENTION

Figure 1:
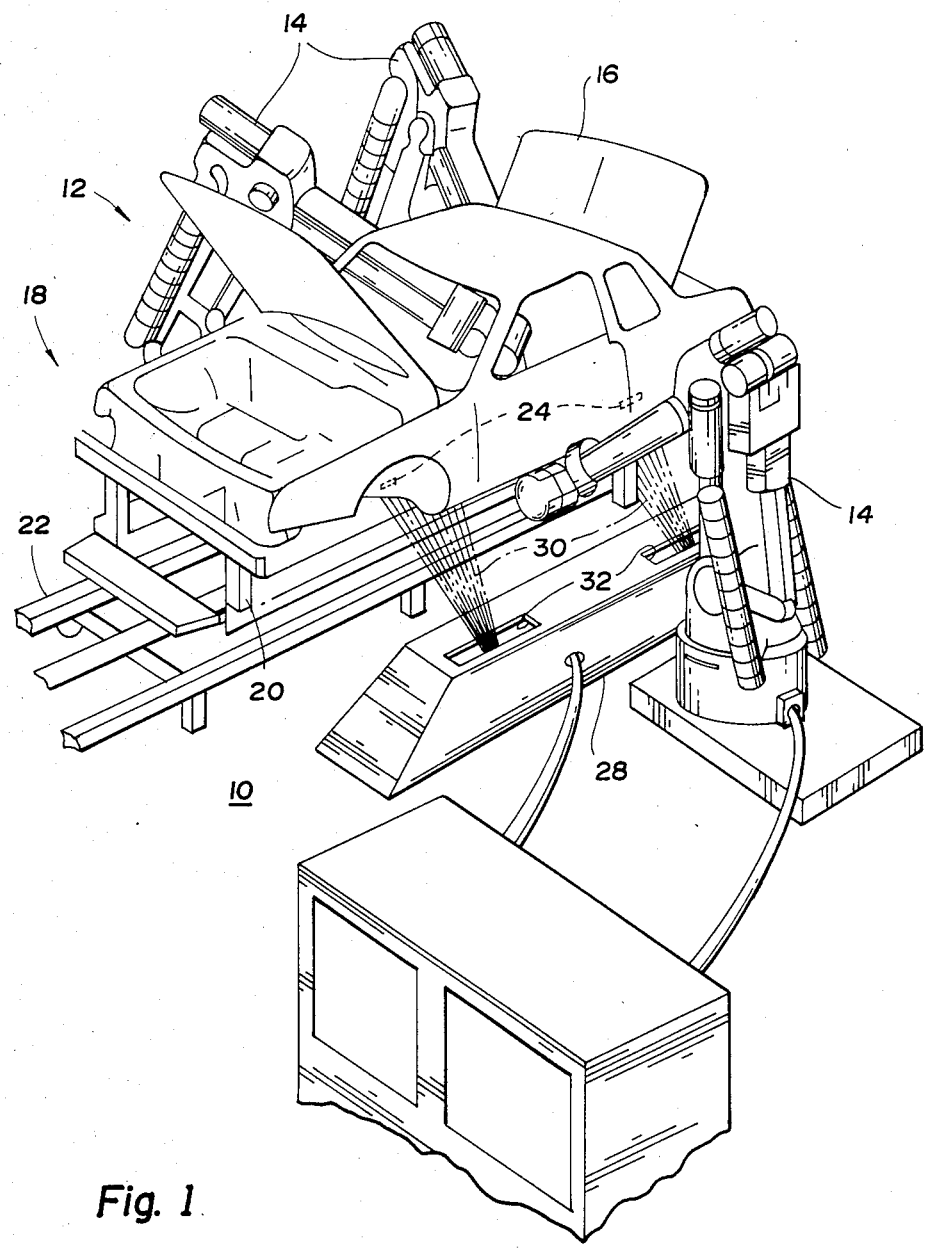
FIG. 1 is a perspective view illustrating the operation of the method and system of the present invention with respect to a partially assembled automotive vehicle at a work station or cell having robots disposed on both sides of the automotive vehicle.
Figure 2:
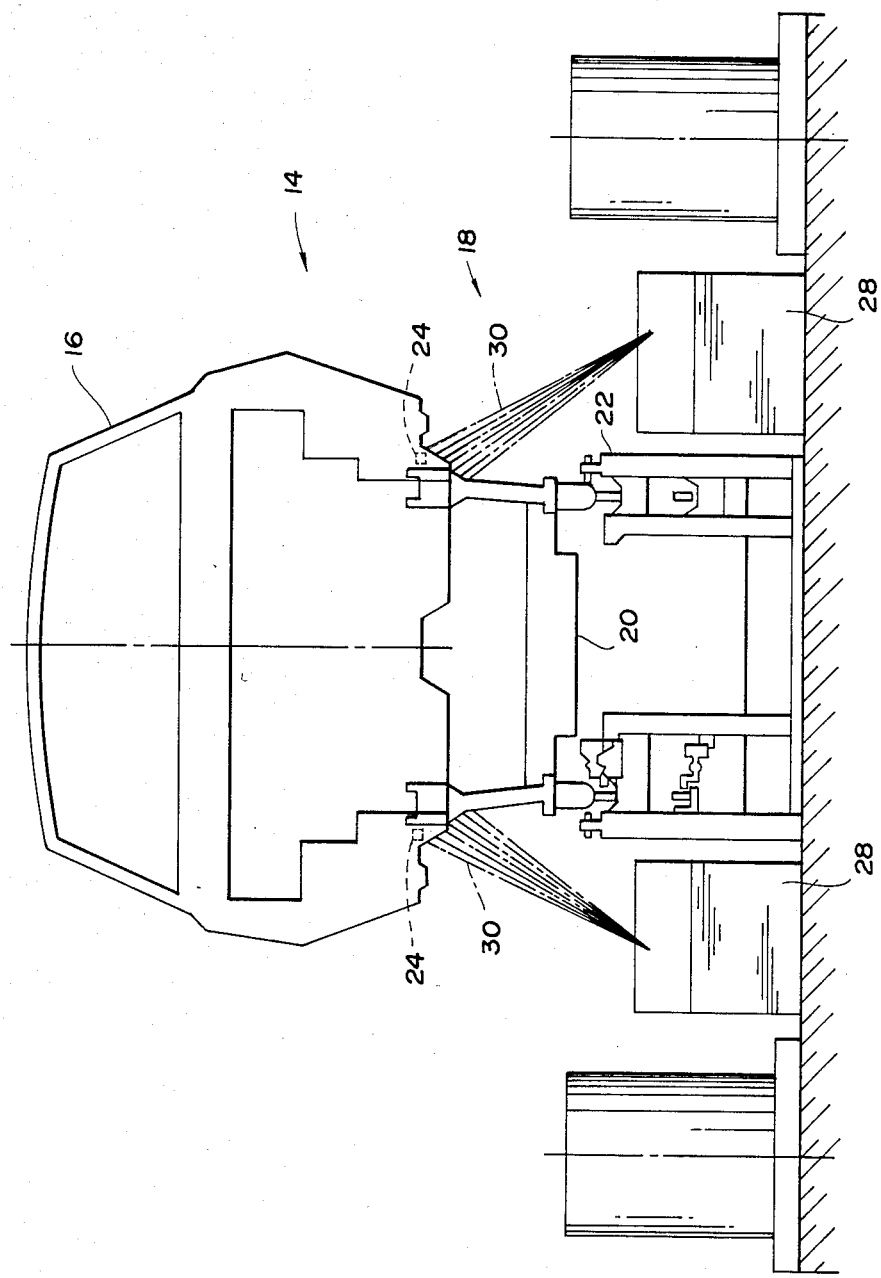
FIG. 2 is an end view of the system of FIG. 1.
Figure 6:
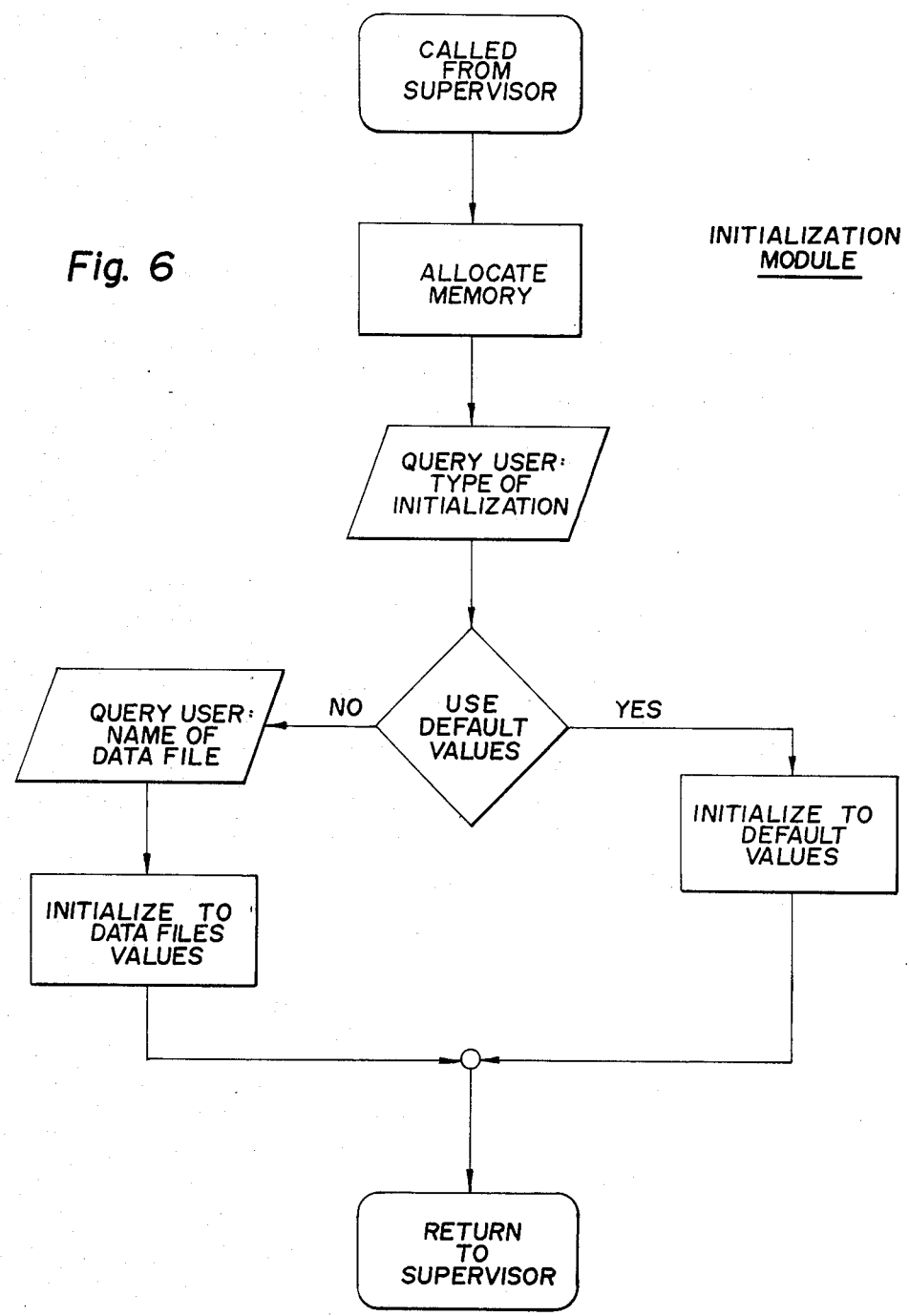
FIG. 6 is a flowchart of an initialization module.

Referring now to FIGS. 1 and 2 there is illustrated the operation of a machine vision system which is not only robust (i.e. relatively unaffected by change in lighting, body position and reflectivity of the viewed body) but also is flexible. By being flexible, the system can readily adapt to changes of its various components and also to body design variation. Use of the method and system not only result in higher productivity but also in improved quality.

The machine vision system constructed in accordance with the present invention is collectively indicated at 10. The system 10 is intended, but not limited to be employed at a work station or cell, generally indicated at 12. In the work station 12, the system 10 is capable of communicating with peripheral devices, such as robots 14 or other peripheral devices, such as programmable controllers, numerically controlled machinery, other vision systems, plant data management systems and the like.

In the application of the system 10 as illustrated in FIG. 1, the robots 14 are preferably utilized to apply an automotive sealant to an automotive body 16. However, it is to be understood that the system 10 may be utilized in other applications, including applications wherein the system 10 may control several work cells by sharing its time between the work cells.

As illustrated in FIGS. 1 and 2, an automotive body 16 is moved along a conveyor line, generally indicated at 18. The vehicle body 16 is mounted on a carriage 20 which, in turn, is mounted for movement on a track 22 in a well-known fashion. In general, the partially completed vehicle body 16 is loosely held by the carriage 20 so that the exact position of the body 16 is not known. However, the system 10 is capable of seeing the body's entire window of positional uncertainty. The window is discontinued so that automation of the work at the work station 12 is possible with the aid of the vision system 10.

On the underside of the vehicle body 16 there are located several carefully positioned gauge holes 24. All automotive manufacturers assemble the entire structure of their vehicle body with respect to such respective gauge holes 24. The gauge holes 24 are relatively invariant and are used as a baseline for all measurements. While the body 16 as a whole may be somewhat non-rigid, the gauge holes 24 maintain a constant relationship with respect to each other.

In general, the system 10 utilizes the gauge holes 24 as visual targets or target points, thereby minimizing the problem of irregularity and compliance of the vehicle body 16. However, it is to be understood that one or more of the visual targets may alternatively comprise a predetermined edge or corner of the body 16 contained within the field of view of the vision system 10.

SYSTEM HARDWARE

The system 10 includes a plurality of spaced apart cameras 26. The cameras preferably comprise conventional CCD's which provide standard television output signals. The cameras 26 are positioned within housings 28 located on opposite sides of the conveyor line 18 within the work station 12. The view lines of each of the cameras 26 is illustrated at 30 and extend through slots 32 formed in the top surface of each housing 28. As illustrated in FIGS. 1 and 2, the gauge holes 24 are disposed within the field of view of each of the cameras 26, so that each of the cameras generates an image plane of data which includes data related to its respective gauge hole 24, as will be described in greater detail hereinbelow.

In general, the cameras 26 may be placed anywhere in the work cell 12 as long as each gauge hole 24 is within its respective camera's field of view. The cameras 26 may be above, below or alongside the body 16. One restriction, however, is that no two camera image planes may be parallel. Optimal performance is achieved when the normal vectors to all image planes are at a significant angle to each other.

Preferably, four cameras 26 are utilized in each work station 12. However, the cameras 26 are utilized in groups of three's when finding the position and attitude of the body 16. Consequently, even if one of the cameras 26 fails, the system 10 is still operable to find the position and attitude of the body 16.

The system 10 does not require any special lighting, such as structured lighting. Relatively large variations in ambient lighting has a minimal effect on the accuracy of the system 10. However, artifical lighting is preferable if the cameras 26 are located in extreme darkness such as might be encountered on the underside of a vehicle body in a poorly illuminated assembly area. Artificial lighting may also be desirable if the work station 12 regularly experiences large changes in ambient light as might happen with direct sunlight. However, in both of the above-noted cases only a few relatively low-cost light fixtures are necessary for a suitable lighting environment.

As shown in FIG. 3 the vehicle body 16 can be thought of as a rigid body with three known target points (i.e. gauge holes 24), each of which is only visible to one of the cameras 26. When the body 16 is in a zero offset or ideal nominal position, there is associated with the body 16 a local or vision coordinate system (VCS) whose origin is located on or near the body 16. At a point corresponding to each of the target points at zero offset position there are erected three mutually perpendicular vectors having a length of unity and direction parallel to the unit vectors of the VCS. Each of the small frames are termed sensor coordinate systems 1, 2 and 3 (i.e. SCS1, SCS2 and SCS3, respectively). The transformations between these three coordinance systems are both known and constant.

The VCS is assumed to remain fixed with respect to the cameras 26. The body 16 has its own coordinate system which is fixed with respect to itself and which can termed the body coordinate system (BCS). When the body 16 is in its zero offset position, the BCS and the VCS are identical. Also, when the body 16 is in its zero offset position, the target points (i.e. gauge holes) 24 and the three sensor coordinate origins correspond exactly.

When the body 16 is moved from its zero offset position the rigid body motion that it undergoes is fully defined by a transformation [T] relating the VCS to the BCS. This transformation is defined with respect to the VCS and completely defines the position and orientation of the BCS and, consequently, the location of the body 16.

The same transformation can be used to define the new location of the target points in the VCS. Given the zero offset positions of the target points and their displaced positions in the VCS, they are directly related by the transformation. It is an object of the present invention to be able to determine the transformation [T] by looking at the target point in each camera's field of view.

Referring now to FIG. 4 there is generally indicated at 34 a calibration fixture including a graduated cube 36 which has surface features which match the size and shape of each of the SCS's. The fixture 34 also include a stand 38 which supports the cube 36 and which is utilized to locate the cube 36 by positioning the stand 38 within the system 12 so that three intersecting edges of the cube 36 are parallel to the mutually perpendicular axes of one of the SCS's. This positioning may be done manually or by one of the robots 14. The fixture 34 is sequentially positioned so that each of the cameras 26 views a specific point of intersection of three edges of the cube 36 and so that the cube's cartesian axes are parallel to the particular SCS of its respective camera. As will be described in greater detail hereinbelow, computer and interface circuits 40 of the system 10 translates the video signals from the cameras 26 into the required information for calibration. The calibration fixture 34 may include a single cube such as the cube 36 which may require multiple moves within the station 12 or it may include multiple cubes which can be simultaneously viewed by the cameras 26.

The calibration information, including the location of the projected vectors from the cube 36 is thereafter stored in a mass storage unit 42 of the system 10. Also stored in the unit 42 as part of the calibration process are the locations of the gauge holes 24 in the BCS.

Alternatively, the calibration information can be manually input into the system 10 through the input device of an I/O terminal 44 of the system 10. The I/O terminal 44 may include video and data monitors to display camera and other information.

The computer and interface circuits 40 provide video interfacing to the three cameras 26. In general, the processor position of the circuits 40 has the ability to perform operations such as convolutions, shift copies and the like on video memory. The computer and interface circuits 40 include memory to accommodate system software and several frames of video images and also includes a communication port for interfacing with various peripheral devices.

SYSTEM SOFTWARE

The system software is illustrated in FIG. 5. The system software is preferably organized in three concurrently running processes or tasks which perform the discrete functions of vision, communication and supervision as indicated by blocks 46, 48 and 50, respectively. The largest and most complex of the three is the system supervisor or supervisor task 50. The supervisor task includes initialization, calibration and runtime modules 54, 56 and 58, respectively. Each of the modules 54, 56 and 58 includes its own user interface.

The vision task 46 is principally concerned with the handling of two-dimensional visual information generated by the cameras 26 in response to requests from the supervisor 50. The communication task 48 comprises an input/output interface process which provides the system software with the capability to access external devices such as robots, programmable controllers, etc, as requested by the supervisor task 50. Lines 52 represent the flow of data between the different tasks, modules and external devices.

VISION TASK

The vision task 46 responds to requests from the supervisor task 50 to set up, find and display vision information generated by the cameras 26. The task 46 provides gray scale image processing and is concerned with finding predetermined geometric forms (i.e. the gauge holes 24) within the two-dimensional image planes formed by the cameras 26. During a typical call to the vision task 46 by the supervisor task 50, the vision task 46 returns the image plane coordinates of a found feature. A conventional vision task is employed to perform this task. The vision task 46 allows live camera images to be shown on the I/O terminal 44 and also saves and restores vision data on the mass storage device 44.

COMMUNICATION TASK

The communication task 48 handles external communications with any type and number of peripheral devices such as robots, programmable controllers, etc. Such peripheral devices may also include numerically controlled machinery, other vision systems, data management systems and the like. A conventional communication task is employed to perform this task.

SUPERVISOR TASK INCLUDING INITIALIZATION MODULE

Figure 7:
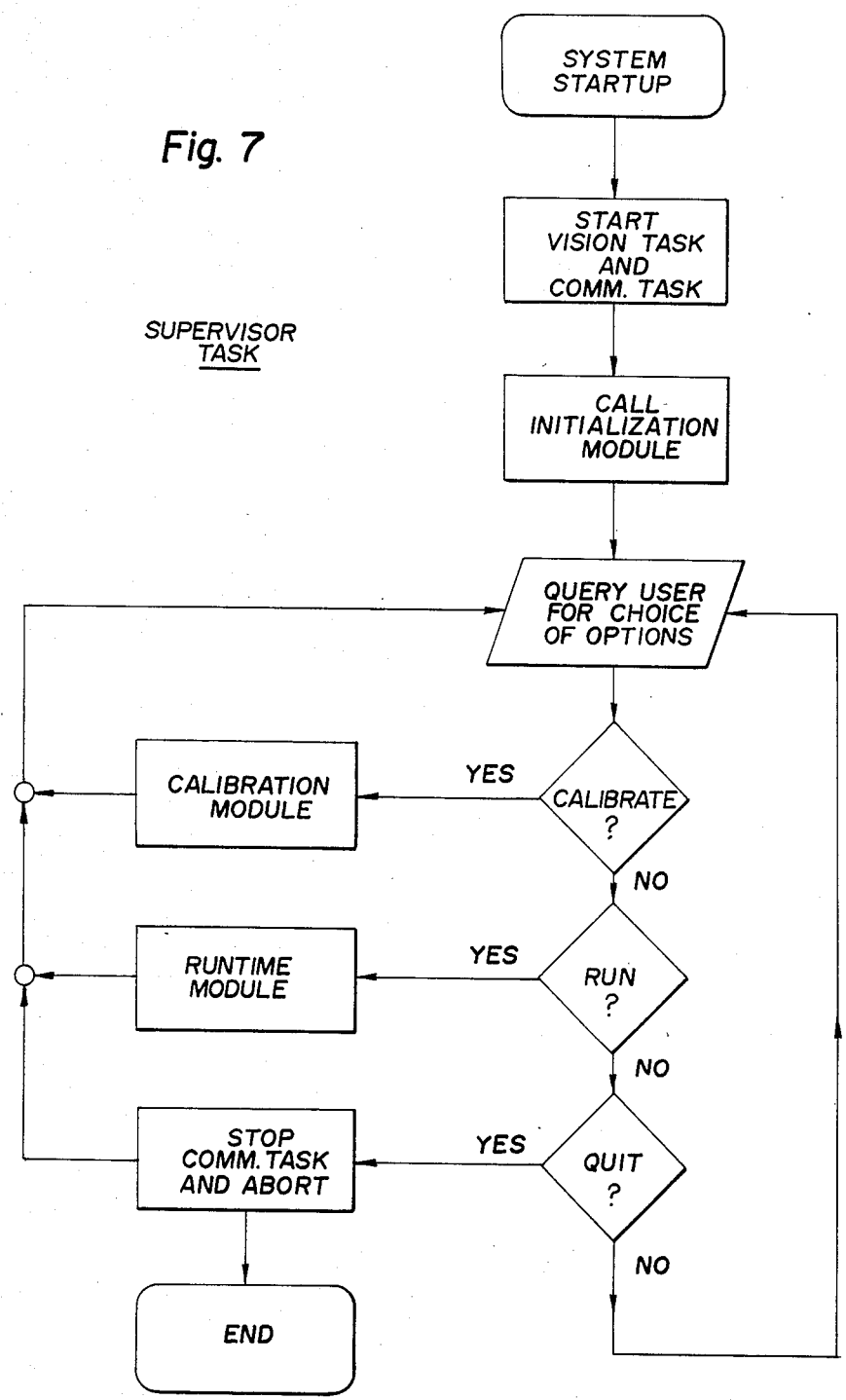
FIG. 7 is a flowchart of a supervisor task.

The supervisor task 50 is illustrated in flow chart form in FIG. 7. In general, the supervisor task 50 controls the operation of all of the components of the system 10. When initiated, the supervisor task 50 starts the communications task 48 and the vision task 46. The supervisor task 50 includes a module called a calibration data structure which has all necessary calibration, projection, scaling and transformation information as is described in greater detail hereinbelow. Thereafter, when the supervisor task 50 calls the initialization module 54, the module 54 allocates and initializes memory for the calibration data structure. The module 54 questions the user from the I/O terminal 44 to determine whether the user wants to select a data file from the system's mass storage device 42. Otherwise, default values are used. In this way the module 54 initializes the system's calibration data structure.

The supervisor task 50 then asks the user of the system 10 at the I/O terminal 44 to select between the different modes of system operation such as calibration or system run modes. The supervisor task 50 also provides for the option to quit and shut down the system 10. When the user specifies the desired mode of operation, the supervisor task 50 calls the appropriate module which, in turn, handles all of the operations within that mode. In any case, the calibration data structure is passed to and from the selected module. As with the communication task 48, the vision task 46 may be called from either the runtime module 58 or the calibration module 56.

The calibration data structure includes the following contents: the number of cameras available to the system and the logical names for each camera and its associated visual target (i.e. gauge hole) set-up information associated with each target-camera pair; information about the actual size of the calibration object such as the cube 36; the transformation between real space and the camera space as well as information concerning the perspective distortion of the cameras; the transformations relating the local frame of reference of the vision system, the robot and the world coordinate system; the nominal position of the body 12 (i.e. the vehicle body on which the robots 14 are taught their work path).

CALIBRATION MODULE

Figure 8:
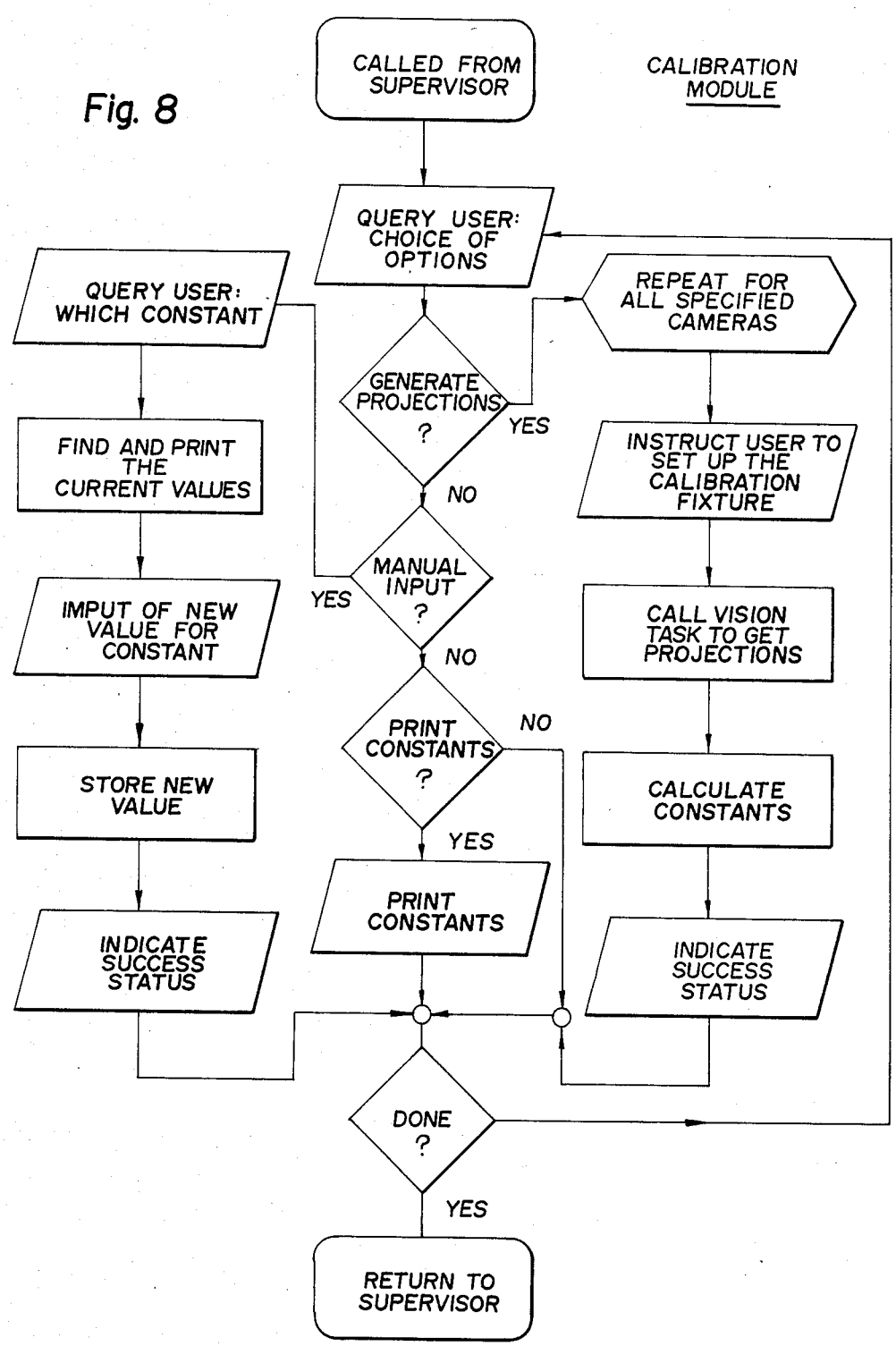
FIG. 8 is a flowchart of a calibration module.

Referring now to FIG. 8 there is illustrated in flow chart form a calibration module 56 which is called from the supervisor task 50. The calibration module 56 allows the user to manually enter and/or alter calibration variables through the I/O terminal 44. The calibration module 56 provides for the following functions:

a. The user may specify the cartesian coordinates of the targets on the rigid body 16 which the system 10 will be locating. These coordinates are specified with respect to the world cartesian frame of reference.

b. The calibration module 56 obtains information about projections of the calibration fixture 34 into the individual camera image planes. This is done either manually or by having a robot bring a calibration object into the field of view of the system cameras 26 and generating projection information automatically from its surface features. This involves calling the vision task 46 and if one of the robots 14 is used, the communication task 44 is also called.

c. The calibration module 56 may display calibration information on the I/O terminal 44.

d. The calibration module 56 allows the user to interactively print and edit other calibration data and constants.

e. The calibration module 56 automatically determines the nominal position of the body 16 in the cameras' fields of view.

f. The calibration module 56 provides for storage and receival of the calibration data from the mass storage device 42 or by communication with a host computer (not shown).

RUNTIME MODULE

Figure 9:
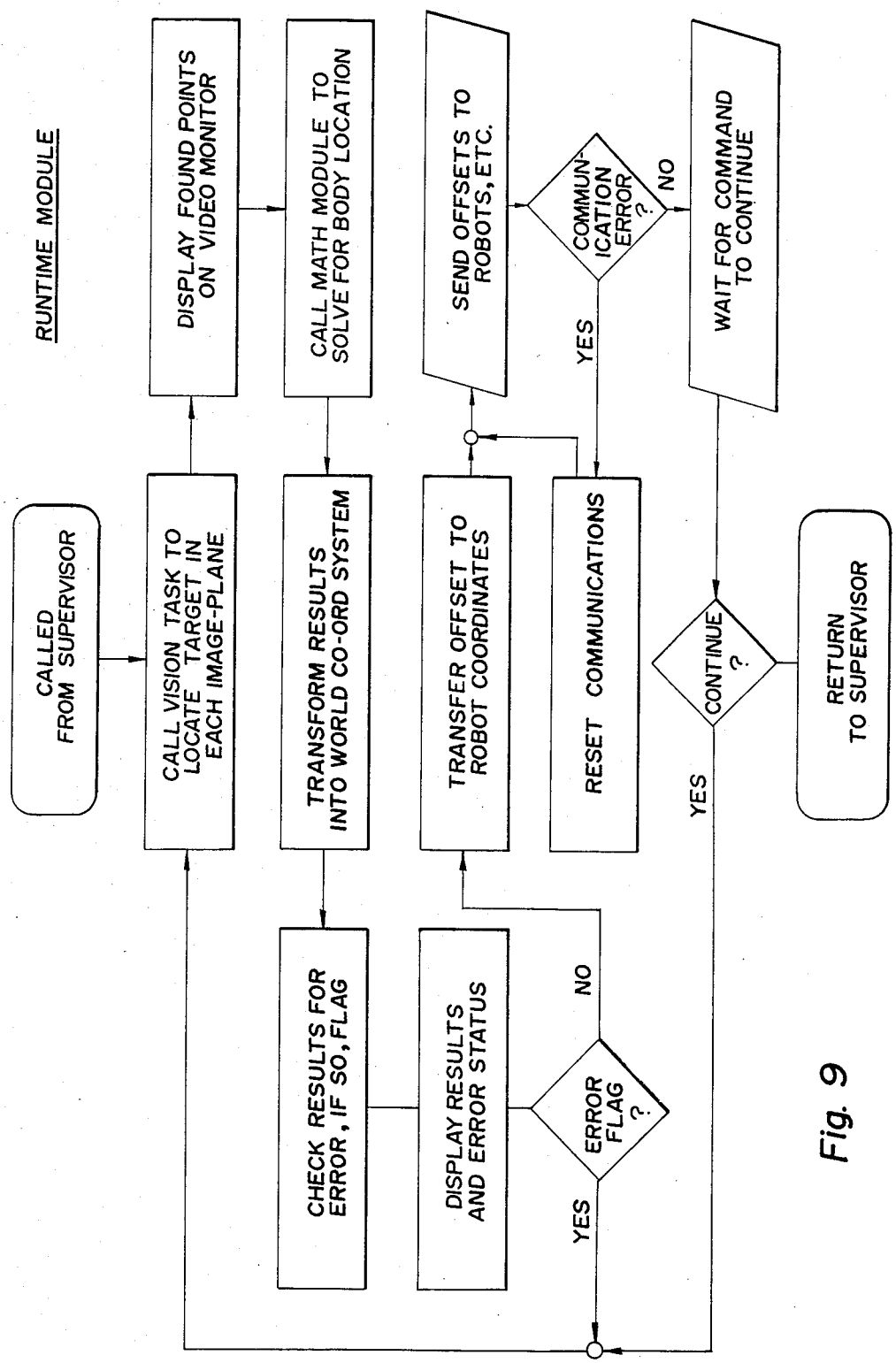
FIG. 9 is a flowchart of a runtime module.

Referring now to FIG. 9 there is illustrated in software flowchart form the runtime module 58. In general, the runtime module 58 generates three-dimensional offsets for the object in the field of view of the cameras 26.

Initially, the runtime module 58 calls the vision task 46 to look at the body 16 in the fields of view of the cameras 26 and find the image plane coordinates of the target points (i.e. gauge holes 24) on the body 16. Then the runtime module 58 displays the found features on the video monitor of the I/O terminal 44. The image plane coordinates and the previously generated calibration data are used to arrive at a quadratic (second order) formulation of the perturbated position of the body 16. This set of quadratic simultaneous equations are solved using a standard iterative technique such as the second order Newton's method. In this way, the six degree of freedom specification of the body's location in space can be solved. The mathematics underlying the above procedure is discussed in greater detail hereinbelow with reference to FIGS. 10A through K.

The runtime module 58 thereafter displays the six degrees of freedom information on the monitor of the I/O terminal 44. At this time the module 58 calls another algorithm to transform the information into six degree of freedom offsets from the previously measured nominal position of the body 16. The module 58 then transforms the vision frame offsets into the frame of reference of a peripheral device such as one or more robots 14. Finally, the module 58 calls the communication task 48 to send the offsets to the robots 14 which are able to use the offsets to compensate their taught paths for the rigid body currently being worked upon.

MATHEMATICAL BACKGROUND FOR THE SYSTEM

When the body 16 is in some offset position, the target points (i.e. gauge holes 24) in the image planes will generally have moved away from the origins of the various SCS's as previously mentioned. The graph appearing in FIG. 10A shows one image plane with its associated calibration projections and $P_1$, the image plane projection of one target point as projected from the body 16 in some offset position. In general, by combining three image plane projections with the calibration data one can determine the six degrees of freedom of offset of the body 16 from its nominal position as described in greater detail hereinbelow and by reference to FIGS. 10A through 10K.

Referring now to FIGS. 10A and 10B, if one assumes that the point $P_1$, lies in the X-Y plane of the SCS1, each camera 26 may be solved independently. The vectors A, B, and P are defined in FIG. 10B. Vectors A and B are the image plane projections of the X and Y unit vectors of SCS1. The X and Y coordinates of $P_1$ (i.e. $x_1$ and $y_1$) are obtained from equations (1) through (4) as illustrated in FIG. 10C. The solutions to equation (4) comprise a simple solution to this restricted case.

Referring to FIG. 10D, in the more generalized case, it is assumed that Z may take on any value. It is possible to solve for $x_1$ and $y_1$ in terms of $z_1$. Doing so for all three image planes and applying some constraints it is possible to obtain an expression for the whole system in terms of $z_1$, $z_2$ and $z_3$ for which solution values may be found. Vectors of equations (5) through (8) are defined in camera frame 1 and $x_1$ and $y_1$ can be solved in terms of $z_1$ from equations (9) through (12) as illustrated in FIGS. 10D and 10E. Equation (12) shows both $x_1$ and $y_1$ as linear functions of $z_1$. Similar equations can be derived for the other two image planes, the full set of equations being given by equations (13) through (15) in FIG. 10F. The constants shown in equations (12) through (15) are calculated in the calibration module for each of the cameras 26.

Equations (13) through (15) comprise six linear equations with nine unknowns. The additional constraint needed to solve these equations is supplied by rigid-body considerations. Because the distances between the three target points 24 are constant, these distances are equivalent to the distances between the SCS origins as measured in the VCS as shown in FIG. 10G. The three constant distances are defined by the equations of FIG. 10H, and, after displacement, the distances are given by equation (10).

Referring now to FIG. 10I, substituting equations (13), (14) and (15) into (16), yields the first set of equations of FIG. 10I which can be rewritten to yield the second set of equations in FIG. 10I. The K, L and M terms are constants which can be easily calculated.

Numerous numerical methods are disclosed in the prior art to solve the second set of equations of FIG. 10I. However, Newton iterations is the preferred method to find the $z_1$, $z_2$ and $z_3$ values. When these values are found, they can be substituted into equations (13), (14), (15) to yield values for $x_1$, $x_2$, $x_3$, $y_1$, $y_2$ and $y_3$ as illustrated in FIG. 10J. As previously mentioned, these values are the positions of the vision targets or gauge hole 24 in each of their respective SCS.

The SCS values of the target points 24 can thereafter be transformed to values in the VCS. Thereafter, the offsets can be easily transformed into a form for robot path compensation or the like as desired by the user.

ITERATIVE PERSPECTIVE COMPENSATION

The Quad method computes offsets of three points by assuming orthographic projection of points on image planes. However, actual projections are close to true perspective projections. In actual perspective projection, the projections of X, Y and Z axes are not linearly graduated on image planes because the end points of each axis are at different distances from the camera.

To compensate for these errors it is necessary to establish a mapping relationship of each projected axis to the actual axis as shown by the first set of equations in FIG. 10K. This mapping relationship for each axis can be obtained by measuring three or more points on each axis at calibration time and then using interpolation to obtain the required relationship. New scale factors are then calculated as shown by the set of equations in FIG. 10K.

This compensation method calculates the offsets of three points using the nominal Quad method. At the end of Quad computation, new scales of axes projections are factored in to compensate for non-linearities. The constants shown in FIG. 10E are recomputed for each image plane as shown by the third set of equations in FIG. 10K. Then the Quad calculations are carried through again.

The above-noted system and method is capable of determining the position and attitude of a rigid body in space utilizing a single point feature from each of the three cameras 26 without the need for structured lighting. By utilizing three cameras 26 and three target points on a body, the system 10 can accurately quickly determine the position of the body. This information can thereafter be communicated to any type of peripheral device such as a robot.

The three-dimensional machine vision system of the present invention does not require the use of highly specialized or complex hardware and is robust (i.e. tolerates small variations in workpieces, camera adjustment and ambient light without significant degradation of system performance). The calibration of the system 10 is quickly and easily accomplished, and if the need for camera or lens replacement arises only that particular camera need be recalibrated.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. Method for automatically determining the position and attitude of a three-dimensional body in space having at least three spaced apart target points at a vision station having a fixed coordinate system, said method comprising the steps of:

generating calibration data defining a nominal position of the body at the vision station;

generating substantially simultaneously a single plane of image data for each of said target points, each plane of image data containing its respective target point and each plane of image data being non-overlapping with respect to each of the other planes of image data;

determining the locations of the target points within their respective image planes to obtain positional data; and processing the calibration data and the positional data together to provide data defining the position and attitude of the body with respect to the fixed coordinate system.

2. The method as claimed in claim 1 wherein said step of generating calibration data includes the steps of positioning a graduated calibration fixture at said vision station; and illuminating the fixture with light to form at least three fixture images in three-dimensional space.

3. The method as claimed in claim 2 wherein said step of generating calibration data includes the step of transforming the fixture images in the three-dimensional space to three planes of calibration data, each of said planes of calibration data including data containing at least four target points on the calibration fixture.

4. The method as claimed in claim 1 wherein said step of generating three planes of image data includes the step of obtaining an intermediate set of data containing a linear projection of each of said target points.

5. The method as claimed in claim 4 wherein said step of generating three planes of image data includes the step of modifying the intermediate set of data to provide perspective compensation of said image data.

6. Method for automatically determining the position and attitude of a three-dimensional body located at a vision station having a fixed coordinate system without the use of structured lighting, the body having at least three spaced apart target points, said method comprising the steps of:

generating calibration data defining a nominal position of the body at the vision station;

illuminating the body with unstructured light to form at least three images in three-dimensional space;

transforming substantially simultaneously the images in three-dimensional space to three planes of image data, each plane of image data containing its respective target point and each plane of image data being non-overlapping with respect to each of the other planes of image data;

determining the locations of the target points within their respective image planes to obtain positional data; and processing the calibration data and the positional data together to provide data defining the position and attitude of the body with respect to the fixed coordinate system.

7. A method of automatically providing path compensation data to a programmed robot controller, to enable a robot controlled by the controller to move along a new path different from the path originally programmed in the controller to work on a three-dimensional body at a work station having a fixed coordinate system, the compensation data defining the difference between actual and nominal positions of the three-dimensional body at the work station, the method comprising the steps of:

generating calibration data defining the nominal position of the three-dimensional body at the work station;

generating substantially simultaneously three planes of image data, each of said planes of image data including image data containing a single target point on said body and each plane of image data being non-overlapping with respect to each of the other planes of image data;

determining the position of each of said target points within each of said image planes to obtain positional data;

processing the calibration data and the positional data of the target points together to obtain location data defining the position and attitude of the body with respect to the fixed coordinate system;

transforming the location data into a first set of offset data defining the difference between the actual and nominal positions of the body in said fixed coordinate system;

transforming the first set of offset data into a second set of offset data in the coordinate system of the robot; and transferring the second set of offset data to the controller.

8. A method of automatically providing path compensation data to a programmed robot controller, to enable a robot controlled by the controller to move along a new path different from the path originally programmed in the controller to work on a three-dimensional body at a work station having a fixed coordinate system, the compensation data defining the difference between actual and nominal positions of the three-dimensional body at the work station, the method comprising the steps of:

generating calibration data defining the nominal position of the three-dimensional body at the work station;

illuminating the body with unstructured light to form at least three non-overlapping images in three-dimensional space;

transforming substantially simultaneously the images in three-dimensional space to three planes of image data, each of said planes of image data including image data containing a single target point on said body and each plane of image data being non-overlapping with respect to each of the other planes of image data;

determining the position of each of said target points within each of said image planes to obtain positional data;

processing the calibration data and the positional data of the target points together to obtain location data defining the position and attitude of the body with respect to the fixed coordinate system;

transforming the resultant data into a first set of offset data defining the difference between the actual and nominal positions of the body in said fixed coordinate system;

transforming the first set of offset data into a second set of offset data in the coordinate system of the robot; and transferring the second set of offset data to the controller.

9. A system for automatically determining the position and attitude of a three-dimensional body in space having at least three spaced apart target points at a vision station having a fixed coordinate system, said system comprising:

means for storing calibration data defining a nominal position of the body at the vision station;

at least three spaced apart cameras, each of said cameras operating substantially simultaneously with each of the other cameras and generating a plane of image data containing a single target point and each plane of image data being non-overlapping with respect to each of the other planes of image data;

means for providing positional data defining the location of the target points within their respective image planes; and means for processing the calibration data and the positional data together to provide data defining the position and attitude of the body with respect to the fixed coordinate system.

10. A system for automatically determining the position and attitude of a three-dimensional body in space having at least three spaced apart target points at a vision station having a fixed coordinate system without the use of structured light, said system comprising:

means for storing calibration data defining a nominal position of the body at the vision station;

at least three spaced apart cameras mounted at predetermined positions at the vision station, each of said cameras having a field of view;

means for illuminating the body with unstructured light to form at least three images in three-dimensional space;

means for moving the body relative to said cameras in the vision station so that each of the target points is positioned within the field of view of its respective camera, each of said cameras operating substantially simultaneously with each of the other cameras to transform the images in three-dimensional space to three planes of image data, each plane of image data containing its respective target point and each plane of image data being non-overlapping with respect to each of the other planes of image data;

means for providing positional data defining the location of the target points within their respective image planes; and means for processing the calibration data and the positional data together to provide data defining the position and attitude of the body with respect to the fixed coordinate system.

11. The system as claimed in claim 9 or 10 including means for generating the calibration data.

12. The system as claimed in claim 11 wherein said means for generating calibration data includes a graduated calibration fixture adapted to be positioned at said vision station within the field of view of each of said cameras.

13. The system as claimed in claim 12 wherein said fixture includes a cubic solid.

14. A system for automatically providing path compensation data to a programmed robot controller, to enable a robot controlled by the controller to move along a new path different from the path originally programmed in the controller to work on a three-dimensional body at a work station having a fixed coordinate system, the compensation data defining the difference between the actual and nominal positions of the three-dimensional body at the work station, the system comprising:

means for storing calibration data defining the nominal position of the three-dimensional body at the work station;

at least three spaced apart cameras mounted at predetermined positions in the work station, each of said cameras having a field of view;

means for moving the body at the work station so that each of the target points is positioned within the field of view of its respective camera, each of said cameras operating substantially simultaneously with each of the other cameras and generating a plane of image data containing its respective target point and each plane of image data being non-overlapping with respect to each of the other planes of image data;

means for providing positional data defining the location of the target points within their respective image planes;

means for processing the calibration data and the positional data of the target points together to obtain location data defining the position and attitude of the body with respect to the fixed coordinate system;

means for transforming the location data into a first set of offset data defining the difference between the actual and nominal positions of the body in said fixed coordinate system;

means for transforming the first set of offset data into a second set of offset data in the coordinate system of the robot; and means for transferring the second set of offset data to the controller.

15. A system for automatically providing path compensation data to a programmed robot controller, to enable a robot controlled by the controller to move along a new path different from the path originally programmed in the controller to work on a three-dimensional body at a work station having a fixed coordinate system, the compensation data defining the difference between actual and nominal positions of the three-dimensional body at the work station, the system comprising:

means for storing calibration data defining the nominal position of the three-dimensional body at the work station;

at least three spaced apart cameras mounted at predetermined positions in the work station, each of said cameras having a field of view;

means for illuminating the body with unstructured light to form at least three images in three-dimensional space;

means for moving the body in the vision station so that each of the target points is positioned within the field of view of its respective camera, each of said cameras operating substantially simultaneously with each of the other cameras to transform the images in three-dimensional space to three planes of image data, each of said planes of image data containing its respective target point and each plane of image data being non-overlapping with respect to each of the other planes of image data;

means for providing positional data defining the location of the target points within their respective image planes;

means for processing the calibration data and the positional data of the target points together to obtain location data defining the position and attitude of the body with respect to the fixed coordinate system;

means for transforming the location data into a first set of offset data defining the difference between the actual and nominal positions of the body in said fixed coordinate system;

means for transforming the first set of offset data into a second set of offset data in the coordinate system of the robot; and means for transferring the second set of offset data to the controller.

16. The system as claimed in claim 14 or 15 including means for generating calibration data.

17. The system as claimed in claim 16 wherein said means for generating calibration data includes a graduated calibration fixture adapted to be positioned at said vision station within the field of view of each of said cameras.

18. The system as claimed in claim 17 wherein said fixture includes a cubic solid.

* * * * *